(12) United States Patent
Canella et al.

(10) Patent No.: US 7,539,846 B2
(45) Date of Patent: May 26, 2009

(54) SIMD PROCESSOR WITH A SUBROUTINE CONTROL UNIT

(75) Inventors: Alberto Canella, Villach (AT); Paul Fugger, Graz (AT); Gerhard Nossing, Villach (AT)

(73) Assignee: Infineon Technologies AG, Munich (DE)

( * ) Notice: Subject to any disclaimer, the term of this patent is extended or adjusted under 35 U.S.C. 154(b) by 460 days.

(21) Appl. No.: 10/232,152

(22) Filed: Aug. 30, 2002

(65) Prior Publication Data

US 2003/0097542 A1    May 22, 2003

(30) Foreign Application Priority Data

Sep. 12, 2001    (DE) ................. 101 44 904

(51) Int. Cl.
  *G06F 15/00*    (2006.01)
  *G06F 15/76*    (2006.01)
(52) U.S. Cl. ................................... 712/22
(58) Field of Classification Search ......... 712/22, 712/35, 221, 243; 713/322; 714/14
See application file for complete search history.

(56) References Cited

U.S. PATENT DOCUMENTS

| | | | | |
|---|---|---|---|---|
| 4,074,851 A | * | 2/1978 | Eichelberger et al. | 714/726 |
| 4,742,520 A | * | 5/1988 | Hoac et al. | 714/801 |
| 4,744,044 A | * | 5/1988 | Stover et al. | 708/530 |
| 4,802,090 A | * | 1/1989 | Mattheyses | 707/102 |
| 5,669,010 A | * | 9/1997 | Duluk, Jr. | 712/22 |
| 5,729,758 A | * | 3/1998 | Inoue et al. | 712/22 |
| 5,740,092 A | * | 4/1998 | Miyake et al. | 708/522 |
| 6,256,743 B1 | * | 7/2001 | Lin | 713/322 |
| 6,272,616 B1 | | 8/2001 | Fernando et al. | |
| 6,490,607 B1 | * | 12/2002 | Oberman | 708/620 |
| 6,586,850 B1 | * | 7/2003 | Powers | 307/85 |

FOREIGN PATENT DOCUMENTS

EP    0 544 127 A2    6/1993

* cited by examiner

*Primary Examiner*—Eddie P Chan
*Assistant Examiner*—Brian P Johnson
(74) *Attorney, Agent, or Firm*—Jenkins, Wilson, Taylor & Hunt, P.A.

(57) ABSTRACT

The invention relates to a method and an apparatus for controlling a digital signal processor having a number of arithmetic units (1a, 1b) which process a program (8). A control unit (5) is provided for independent control of the individual arithmetic units (1a, 1b), which control unit (5) reads and evaluates the flags (9a, 9b) which are specific to the arithmetic units, and deactivates those arithmetic units (1a, 1b) whose associated flag is not set, so that a subroutine is carried out only by those arithmetic units (1a, 1b) whose flags are set.

8 Claims, 2 Drawing Sheets

SIMD PROCESSOR WITH A SUBROUTINE CONTROL UNIT

TECHNICAL FIELD

The invention relates to a method for controlling a digital signal processor (DSP), and to an SIMD as claimed in the preamble of patent claims 1 and 7, respectively.

BACKGROUND ART

SIMD processors (SIMD: Single Instruction Multiple Data) are able to process a number of data streams in parallel, with only one program being used. They are thus used, for example, in telephone systems, where the speech data from a number of channels must be processed, and must be output on a transmission line, simultaneously.

Conventional SIMD processors have two or more arithmetic units, which are also referred to as ALUs (ALU: Arithmetic Logic Unit), and a program which is stored in a memory and is carried out simultaneously by all the arithmetic units. This program generally contains a series of subroutines, which are called by the main program, for example by means of a "Call command".

The subroutines are normally also processed simultaneously by the arithmetic units. However, it is possible for a specific section of the main program or a subroutine to be carried out only by specific ones of the arithmetic units, but not by others. For example, a conditional call command may occur, whose jump condition is satisfied only by specific arithmetic units which are intended to process that subroutine.

In this case, conventional SIMD processors would produce incorrect results, since the program is always carried out simultaneously by all the arithmetic units in these processors.

The object of the present invention is thus to provide a method for controlling an SIMD processor as well as such an SIMD processor, in which predetermined program sections, in particular subroutines, can be carried out by only some of the arithmetic units.

This object is achieved by the features specified in patent claim 1 and in patent claim 7. Specific embodiments of the invention are the subject matter of dependent claims.

The fundamental idea of the invention is to control an SIMD signal processor such that those arithmetic units are switched off or deactivated which are not intended to carry out a specific program section, in particular a subroutine. These arithmetic units are then switched on or activated again at the end of that program section. According to the invention, the arithmetic units are controlled by means of flags (markers) which are specific to specific arithmetic units. Each arithmetic unit is preferably allocated its own flag, which indicates whether that arithmetic unit should or should not be deactivated.

Said flags are generally variables which are set or reset and, in particular, can be linked to predetermined conditions. The default setting for the flags is, for example, "active" (set), that is to say the arithmetic units are intended to remain switched on.

In order to find out which of the arithmetic units are intended to remain switched on and which are intended to be switched off, the flags of the arithmetic units are first of all read and evaluated. Those arithmetic units whose associated flag was not set are then switched off.

Finally, the program section or the subroutine is carried out only by those arithmetic units whose flag was set.

The reading and evaluation of the flags which are specific to arithmetic units are preferably carried out before the program is intended to jump into a subroutine (that is to say in the case of a call command, in particular in the case of a conditional call command).

The subroutine is preferably not called when all the flags are inactive.

SUMMARY OF THE INVENTION

According to one preferred embodiment of the invention, the arithmetic units are switched off by switching off an associated system clock. One arithmetic unit could optionally also be deactivated by means of a circuit (flipflop) with an enable function.

In order to switch off one of the arithmetic units, the control unit preferably produces an appropriate switching-off signal.

BRIEF DESCRIPTION OF THE DRAWINGS

The invention will be explained in more detail in the following text using the attached drawings by way of example, in which.

DETAILED DESCRIPTION OF THE INVENTION

Figure 1:
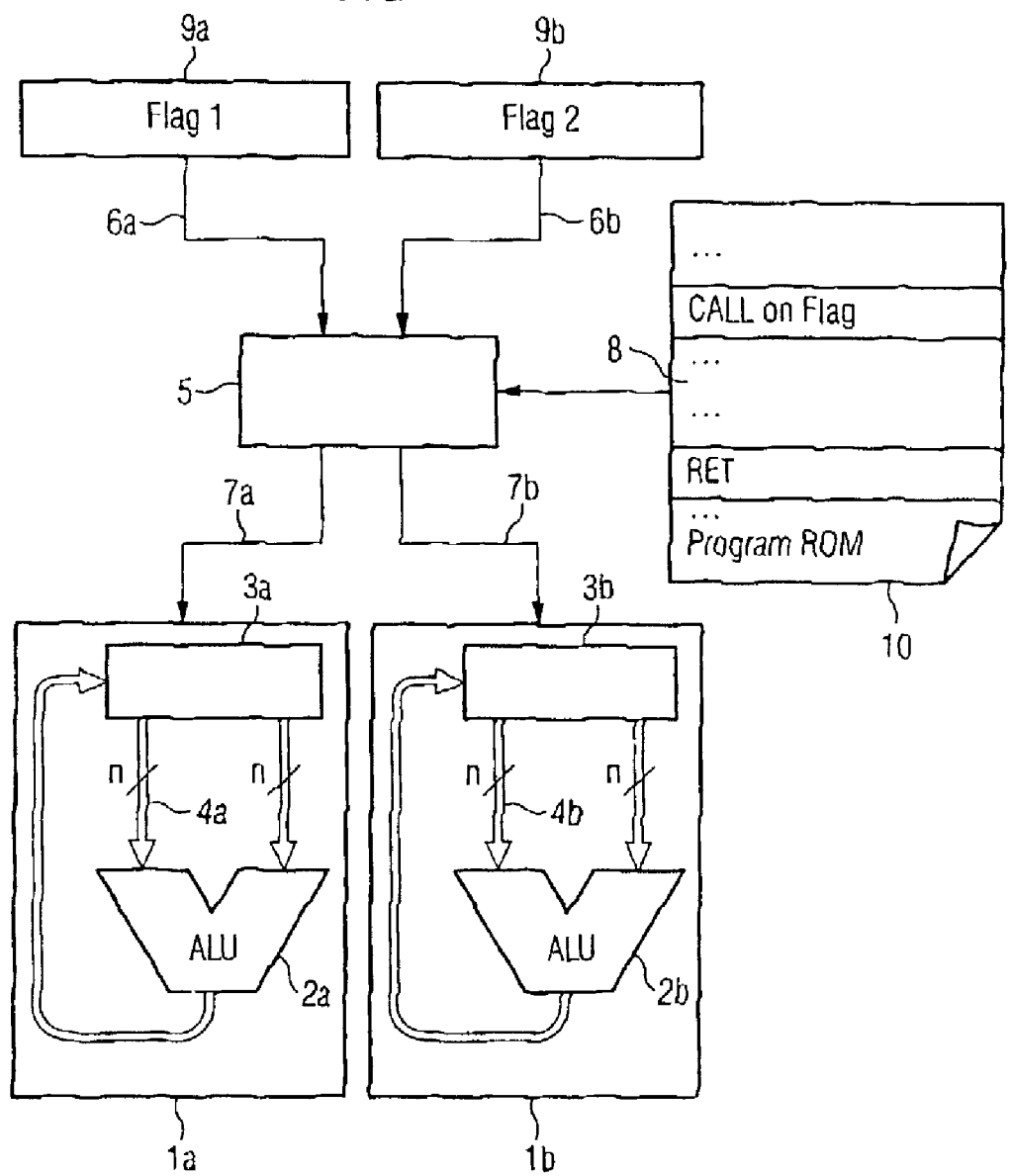
FIG. 1 shows an outline illustration of an SIMD processor based on one exemplary embodiment of the invention.

FIG. 1 shows an SIMD signal processor with two arithmetic units 1a, 1b, which normally process a program 8, which is stored in a memory 10 (ROM), simultaneously. The arithmetic units 1a, 1b each have computation units 2a, 2b, the actual ALUs, as well as registers 3a, 3b from which data streams 4a, 4b with n bits can be read.

The following text assumes that the program 8 calls a subroutine (call command) which, for example, is intended to be carried out only by the arithmetic unit 1a. The arithmetic unit 1b is intended to be switched off.

To do this, the SIMD signal processor has a control unit 5 which reads and evaluates a flag 9a for the first arithmetic unit 1a and a flag 9b for the second arithmetic unit 1b, via the paths 6a, 6b. The flags 9a, 9b may be stored, for example, in a RAM.

Since the subroutine is intended to be carried out only by the arithmetic unit 1a, the flag 9a is active and the flag 9b from the arithmetic unit 1b is inactive (not set). In a corresponding way, the control unit 5 outputs a switching-off signal via the channel 7b to the arithmetic unit 1b which, in consequence, is deactivated until a return command occurs at the end of the subroutine.

One possible control program which runs in the control unit 5 is described in the following text:

```
set    Powerdown_Channel_1=off;      //DEFAULT:BOTH CHANNELS ACTIVE
set Powerdown_Channel_2=off;
if (Command from ROM=CALL) then
   if Flag_Channel_1=inactive AND Flag Channel_2=inactive
      (goto Next_Command from Next_Address;    // NO
```

-continued

```
        CALL!!!
    elsif (Flag_Channel_1=inactive)
        set Powerdown_Channel_1=on;
        goto Subprogram_Address;       //ONLY CHANNEL 2
        ACTIVE
    elsif (Flag_Channel_2=inactive) WHEN
        set Powerdown_Channel_2=on;
        goto Subprogram_Address; // ONLY CHANNEL 1 ACTIVE
    Andif;
    elsif (Command from ROM=RIT) then
        set Powerdown_Channel_1=off;
        set Powerdown_Channel_2=off;
    else
...
```

The program is essentially self-explanatory and includes three alternatives, namely: 1) the flags of both arithmetic units 1a, 1b (Channel 1, Channel 2) are inactive; 2) only the flag for the arithmetic unit la is inactive; and 3) only the flag for the arithmetic unit 2 is inactive.

Figure 2:
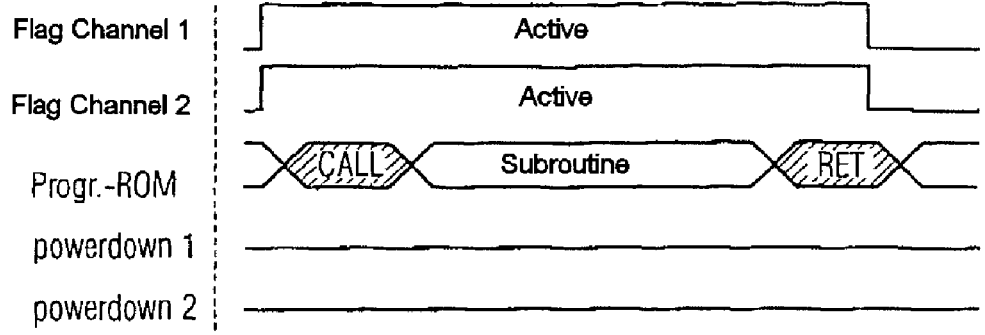
FIG. 2 shows a program sequence when two flags are active.

FIG. 2 shows an example of a program sequence in which the flags 9a, 9b of both arithmetic units 1a, 1b (Channel 1 and Channel 2, respectively) are active (default setting). After a call command, a subroutine is carried out by both arithmetic units 1a, 1b. In this case, the control unit 5 does not output any switching-off signal (Powerdown 1, Powerdown 2).

Figure 3:
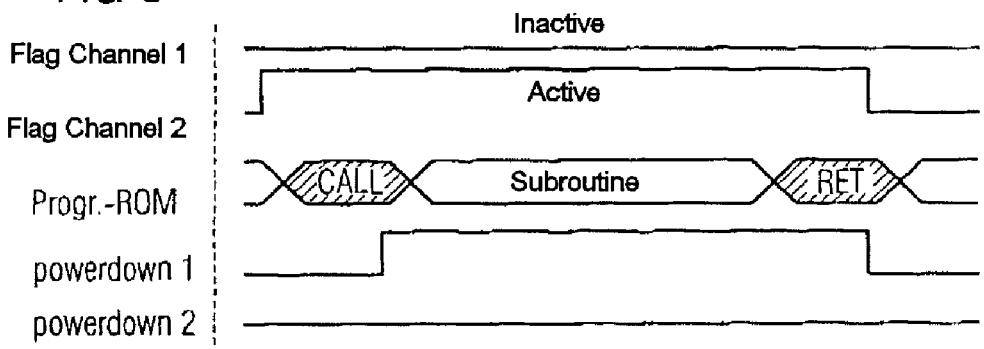
FIG. 3 shows a program sequence when one flag is active and one flag is inactive.

FIG. 3 shows a program sequence in which the flag 9a is inactive (not set). When a call command occurs in the main program 8, the control unit 5 deactivates the arithmetic unit 1a (0/1 flank in the Signal Powerdown 1). The arithmetic unit 1a remains inactive until the subroutine has been processed, and a return command (RET) has been carried out.

Figure 4:
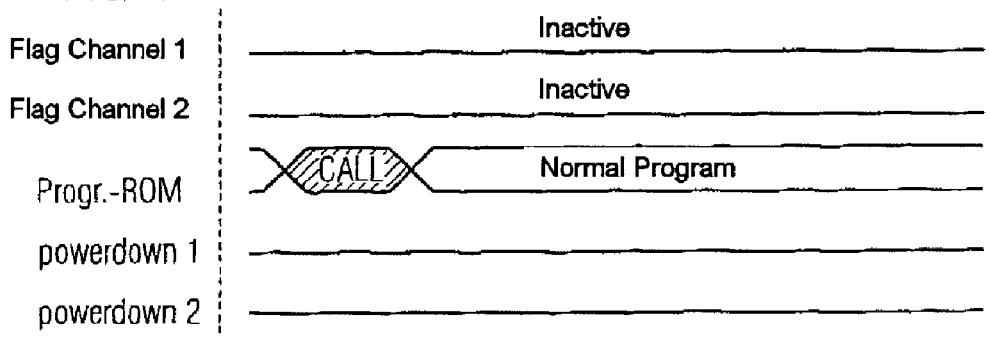
FIG. 4 shows a program sequence when two flags are inactive.

FIG. 4 shows a program sequence in which the flags 9a, 9b of both arithmetic units 1a, 1b are inactive. A call command in the main program 8 results in the main program 8 being continued. No subroutine is called. The control unit 5 does not output any switching-off signal to the arithmetic units 1a, 1b.

| List of reference symbols | |
| --- | --- |
| 1a, 1b | Arithmetic units |
| 2a, 2b | ALU |
| 3a, 3b | Registers |
| 4a, 4b | Data streams |
| 5 | Control unit |
| 6a, 6b | Connecting lines |
| 7a, 7b | Channels |
| 8 | Program |
| 9a, 9b | Flags |
| 10 | Memory |

The invention claimed is:

1. A method for controlling a digital signal single instruction multiple data (SIMD) processor, having a number of arithmetic units the method comprising:

(a) processing one program simultaneously on each of a number of arithmetic units so that a number of data streams are processed in parallel,
  (b) reading and evaluating flags which are specific to specific arithmetic units,
  (c) switching off the arithmetic units whose associated flag is not set and calling a subroutine by the program, which is carried out by the arithmetic units whose flag is set, if at least one of the flags is set,
  (d) switching on the arithmetic units which have been switched off once the subroutine has been processed, and
  (e) refraining from calling the subroutine and refraining from switching off the arithmetic units if none of the flags are set.

2. The method as claimed in claim 1, wherein the arithmetic units are switched off by switching off a system clock for the arithmetic units.

3. The method as claimed in claim 1, wherein a control unit produces a switching-off signal when a flag is not set.

4. The method as claimed in claim 1, wherein the flag of an arithmetic unit is set when a predetermined condition occurs.

5. A digital signal single instruction multiple data (SIMD) signal processor having a number of arithmetic units and having a memory for one program which is processed simultaneously by each one of the arithmetic units so that a number of data streams are processed in parallel, distinguished by a control unit which is connected to the arithmetic units to switch off one or more of the arithmetic units if at least one of a plurality of flags is set which are specific to specific arithmetic units, wherein the digital signal processor is configured such that the one or more of the arithmetic units which are switched off do not implement a subroutine called by the program, wherein the digital signal processor is further configured to refrain from calling the subroutine and refraining from switching off the arithmetic units if none of the flags are set, and wherein the control unit is configured to switch on the arithmetic units which have been switched off once the subroutine has been processed.

6. The digital signal processor as claimed in claim 5, wherein an arithmetic unit is switched off when an associated flag, which is specific to that arithmetic unit, is not set.

7. The method as claimed in claim 1, wherein switching on the arithmetic units comprises switching on the arithmetic units which have been switched off in response to a return command that is carried out once the subroutine has been processed.

8. The digital signal processor as claimed in claim 5, wherein the control unit is configured to switch on the arithmetic units which have been switched off in response to a return command that is carried out once the subroutine has been processed.

* * * * *